(12) United States Patent
Velusamy et al.

(10) Patent No.: US 10,404,654 B1
(45) Date of Patent: Sep. 3, 2019

(54) NETWORK ADDRESS DISTRIBUTION TO WIRELESS RELAYS IN A WIRELESS DATA COMMUNICATION NETWORK

(71) Applicant: Sprint Communications Company L.P., Overland Park, KS (US)

(72) Inventors: Saravana Velusamy, Overland Park, KS (US); Sreekar Marupaduga, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 126 days.

(21) Appl. No.: 15/333,155

(22) Filed: Oct. 24, 2016

(51) Int. Cl.
| | | |
|---|---|---|
| *H04L 29/12* | (2006.01) | |
| *H04B 7/14* | (2006.01) | |
| *H04L 12/46* | (2006.01) | |
| *H04W 88/16* | (2009.01) | |
| *H04L 12/24* | (2006.01) | |

(52) U.S. Cl.
CPC .......... *H04L 61/2061* (2013.01); *H04B 7/14* (2013.01); *H04L 12/4641* (2013.01); *H04L 61/1511* (2013.01); *H04L 61/2007* (2013.01); *H04L 41/08* (2013.01); *H04W 88/16* (2013.01)

(58) Field of Classification Search
CPC ............. H04L 61/2061; H04L 61/1511; H04L 61/2007; H04L 12/4641; H04L 41/08; H04B 7/14; H04W 88/16
See application file for complete search history.

(56) References Cited

U.S. PATENT DOCUMENTS

| | | | |
|---|---|---|---|
| 7,885,233 B2 * | 2/2011 | Nagarajan | H04L 12/1886 370/312 |
| 8,009,615 B2 | 8/2011 | Krishnakumar et al. | |
| 8,300,555 B2 | 10/2012 | Horn et al. | |
| 8,380,819 B2 | 2/2013 | Ankaiah et al. | |
| 8,539,055 B2 | 9/2013 | Lv et al. | |
| 8,737,267 B2 | 5/2014 | Horn et al. | |
| 9,166,946 B2 | 10/2015 | Wang | |
| 9,344,397 B2 | 5/2016 | Iyer | |
| 2006/0047791 A1 * | 3/2006 | Bahl | H04L 61/2015 709/220 |
| 2007/0011301 A1 * | 1/2007 | Ong | H04L 61/2015 709/224 |
| 2010/0172285 A1 * | 7/2010 | Tokuyasu | H04W 88/04 370/315 |
| 2013/0028139 A1 | 1/2013 | Sanneck et al. | |

(Continued)

*Primary Examiner* — Jenee Holland
*Assistant Examiner* — Latresa A McCallum

(57) ABSTRACT

A wireless data communication network distributes network addresses to wireless relays. The network receives attachment requests from the wireless relay over wireless access points and transfers network address requests to a network address server. The network receives network address responses from the network address server having network addresses for the wireless relay. The network stores the network addresses for the wireless relay in a memory and transfers the network addresses to the wireless relay. The network wirelessly exchanges user data with the wireless relay. The network receives subsequent attachment requests from the wireless relay and retrieves the network addresses for the wireless relay from the memory without re-using the network address server. The network transfers the network addresses to the wireless relay and wirelessly exchanges user data with the wireless relay.

18 Claims, 6 Drawing Sheets

(56) References Cited

U.S. PATENT DOCUMENTS

| | | | |
|---|---|---|---|
| 2013/0343344 A1* | 12/2013 | Hassan | H04W 36/30 370/332 |
| 2015/0319042 A1* | 11/2015 | PalChaudhuri | H04L 41/0873 370/395.53 |
| 2016/0330165 A1* | 11/2016 | Jeanne | H04L 61/103 |
| 2017/0048790 A1* | 2/2017 | Pratapa | H04L 65/1016 |

* cited by examiner

US 10,404,654 B1

NETWORK ADDRESS DISTRIBUTION TO WIRELESS RELAYS IN A WIRELESS DATA COMMUNICATION NETWORK

TECHNICAL BACKGROUND

Data communication systems exchange user data for user equipment to provide various data communication services. The user equipment may be phones, computers, media players, intelligent machines, and the like. The data communication services might be media streaming, video conferencing, machine-to-machine data transfers, internet access, or some other computerized information service.

Data communication systems use wireless access points to extend the range of their communication services and enable user mobility. The wireless access points perform wireless networking tasks like device handovers, radio interference management, and multipoint coordination. In Long Term Evolution (LTE) networks, the wireless access points are evolved Node Bs (eNodeBs).

To extend the wireless service footprint even more, wireless relays are used between the wireless access points and the user equipment. A wireless relay exchanges wireless signals that transport user data with user equipment. The wireless relay also exchanges corresponding wireless signals that transport the user data with the wireless access points. The wireless relay may attach to several wireless access points to obtain better service for the user equipment. Each attachment for the wireless relay requires that access network access a Dynamic Host Configuration Protocol (DHCP) server to obtain an Internet Protocol (IP) address. DHCP access uses a Discover Offer Request Acknowledge (DORA) process that requires several messages. If the wireless relay attaches to 12 wireless access points, then the DHCP server is contacted 12 times to get 12 IP addresses for the wireless relay. The DORA messaging for wireless relay attachment is significant.

Unfortunately, the wireless relay periodically re-attaches to the wireless access points. This re-attachment requires additional DORA messaging to reacquire the IP addresses and networking data for the wireless relay. The re-attachment situation is exacerbated when multiple wireless relays re-attach at the same time—perhaps after a power outage. The use of the DHCP server in this manner becomes expensive and time-consuming.

TECHNICAL OVERVIEW

A wireless data communication network distributes network addresses to a wireless relay. The wireless network receives attachment requests from the wireless relay over multiple wireless access points and transfers network address requests to a network address server. The wireless network receives network address responses from the network address server having network addresses for the wireless relay. The wireless network stores the network addresses for the wireless relay in a memory and transfers the network addresses to the wireless relay. The wireless network may then exchange user data with the wireless relay. The wireless network receives subsequent attachment requests from the wireless relay and retrieves the network addresses for the wireless relay from the memory without re-using the network address server. The wireless network transfers the network addresses to the wireless relay and exchanges additional user data with the wireless relay.

DETAILED DESCRIPTION

Figure 1:
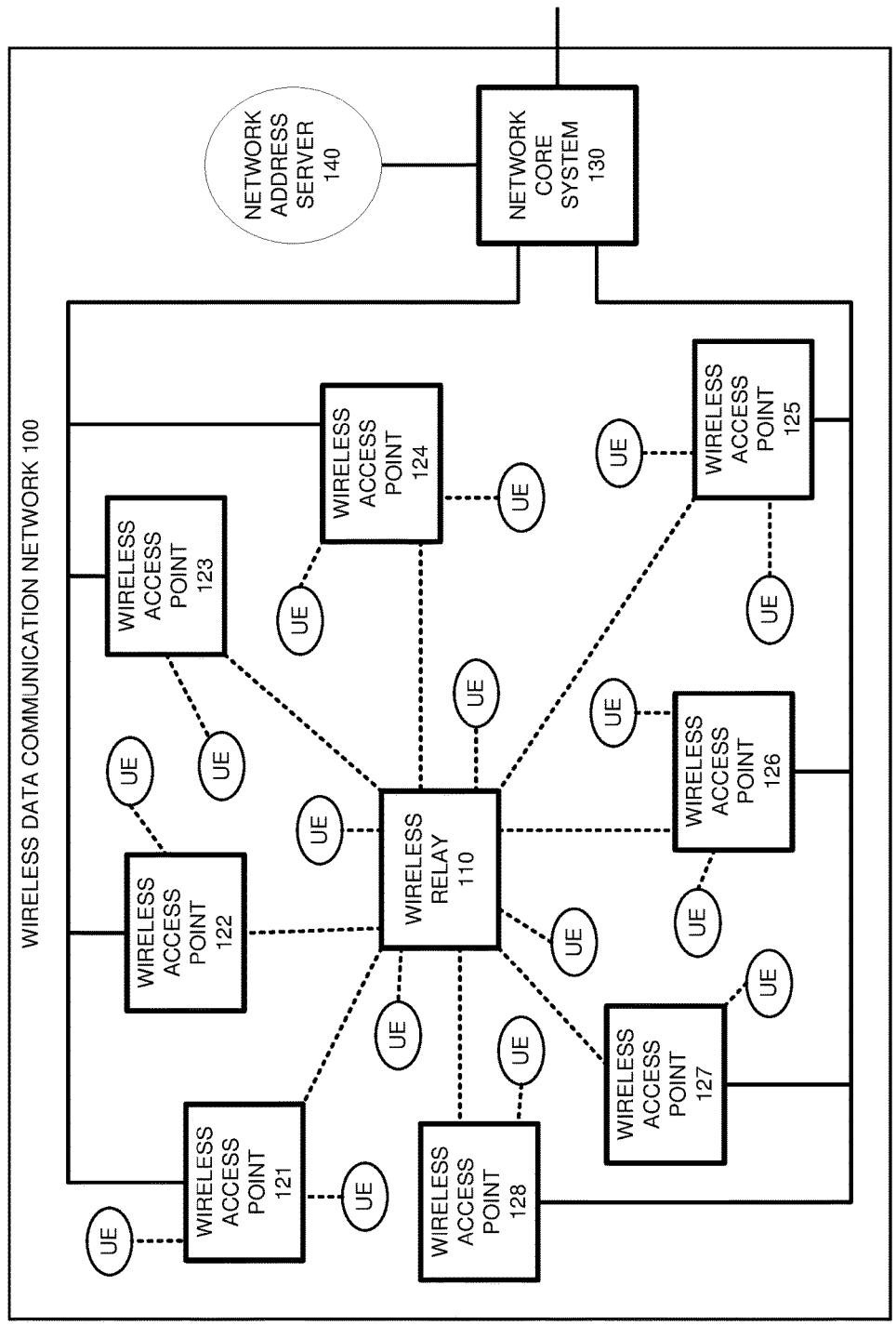
FIGS. 1-4 illustrate a wireless data communication network to distribute network addresses to wireless relays.

FIGS. 1-4 illustrate wireless data communication network 100 to distribute network addresses to wireless relay 110. Referring to FIG. 1, wireless data communication network 100 exchanges user data for various User Equipment (UE). Each UE comprises a computer, phone, or some other intelligent machine with a wireless communication transceiver. These data exchanges support data services such as content streaming, media conferencing, machine communications, internet access, or some other computerized information service.

Wireless communication network 100 comprises wireless relay 110, wireless access points 121-128, network core system 130, and network address server 140. Wireless relay 110 includes an internal wireless base station to serve some of the UEs. Wireless relay 110 also includes relay equipment to communicate with wireless access points 121-128. Wireless relay 110 comprises antennas, modulators, amplifiers, filters, and signal processing circuitry for wireless communication. Wireless relay 110 also includes data processing systems with circuitry, memory, and software.

Wireless access points 121-128 also comprise antennas, modulators, amplifiers, filters, and signal processing circuitry for wireless communication with the UEs and with wireless relay 110. Wireless access points 121-128 include network interfaces like switches and routers for data communications with network core system 130. Wireless access points 121-128 include data processing systems with circuitry, memory, and software. In some examples, wireless access points 121-128 and the base station in wireless relay comprise Long Term Evolution (LTE) evolved Node Bs (eNodeBs).

Network core system 130 comprises computer equipment with software, such as packet gateways, network controllers, authorization databases, and the like. In some examples, network core system 130 comprises an LTE or System Architecture Evolution (SAE) core. The LTE/SAE core typically includes Serving Gateways (S-GWs), Mobility Management Entities (MMEs), Home Subscriber Systems (HSS), Packet Data Network Gateways (P-GWs), and Policy Charging Rules Functions (PCRFs).

Network address server 140 comprises computer equipment with software to serve network addresses and related networking data. An exemplary network address server 140 is a Dynamic Host Configuration Protocol (DHCP) server that uses the Discover Offer Request Acknowledge (DORA) process. The network addresses may be Internet Protocol (IP) addresses, IP ports, and IP versions. The related networking data may also indicate DHCP Option 43 data, DHCP option 60 data, Virtual Local Area Network Identifiers (VLAN IDs), Emergency Medical Services (EMS) data, Domain Name Service (DNS) addressing, and the like.

Prior to serving any UEs, wireless relay 110 individually attaches to multiple wireless access points 121-128. For example, wireless relay 110 may perform several radio scans to find multiple wireless access points at geo-diverse azimuths. Thus, the radio scans might be every 30 degrees for a total of twelve radio scans and twelve wireless access point attachments. The wireless access point attachments are typically part of the boot-up or reset process for wireless relay 110. Wireless access points 121-128 receive and transfer their attachment request to network core system 130. Network core system 130 receives the attachment requests and responsively transfers network address requests to network address server 140.

Network address server 140 processes each network address request to select a network address and related data for wireless relay 110. In this example, wireless relay 110 receives eight network addresses from the eight wireless attachments. Network core system 130 receives network address responses back from network address server 140. The network address responses have the network addresses and related data for the wireless relay. Network core system 130 stores the network addresses and related data for wireless relay 110 in a memory and sets an address timer. This network attachment procedure may entail a DORA session.

Network core system 130 transfers the network addresses and related data to wireless access points 121-128. Wireless access points 121-128 wirelessly transfer the network addresses and related data to wireless relay 110. Wireless relay 110 then wirelessly exchanges user data between the UEs and at least some wireless access points 121-128. Wireless access points 121-128 and network core system 130 exchange the user data and network addresses, and network core system 130 exchanges the user data with external systems.

Wireless relay 110 eventually re-attaches to wireless access points 121-128. For example, wireless relay 110 may lose power and power back up. Alternatively, a user may reset wireless relay 110. Wireless access points 121-128 receive and transfer the re-attachment requests to network core system 130. Network core system 130 receives the re-attachment requests and responsively retrieves the network addresses and related data for wireless relay 110 from its memory—if the address timer has not yet expired. The address timer may be set for a few minutes and may be extended as the network addresses are used. Note that network address server 140 is not re-used to get the network addresses and related data for wireless relay 110 in this case, and the costly data exchanges with network address server 140 are avoided.

Network core system 130 transfers the network addresses and related data to wireless access points 121-128. Wireless access points 121-128 wirelessly transfers the network addresses and related data to wireless relay 110. Wireless relay 110 wirelessly exchanges user data between the UEs and at least some of wireless access points 121-128. These wireless access points 121-128 and network core system 130 exchange the user data and the network addresses. Network core system 130 exchanges the user data with external systems.

Advantageously, network core system 130 reduces data access to network address server 140. Moreover, network core system 130 can handle mass attachment scenarios where multiple wireless relays attempt to re-attach at the same time—perhaps after a power outage. The reduction in access to network address server 140 conserves valuable network resources during re-attachments. The access reduction to network address server 140 also saves valuable time during re-attachments.

Figure 2:
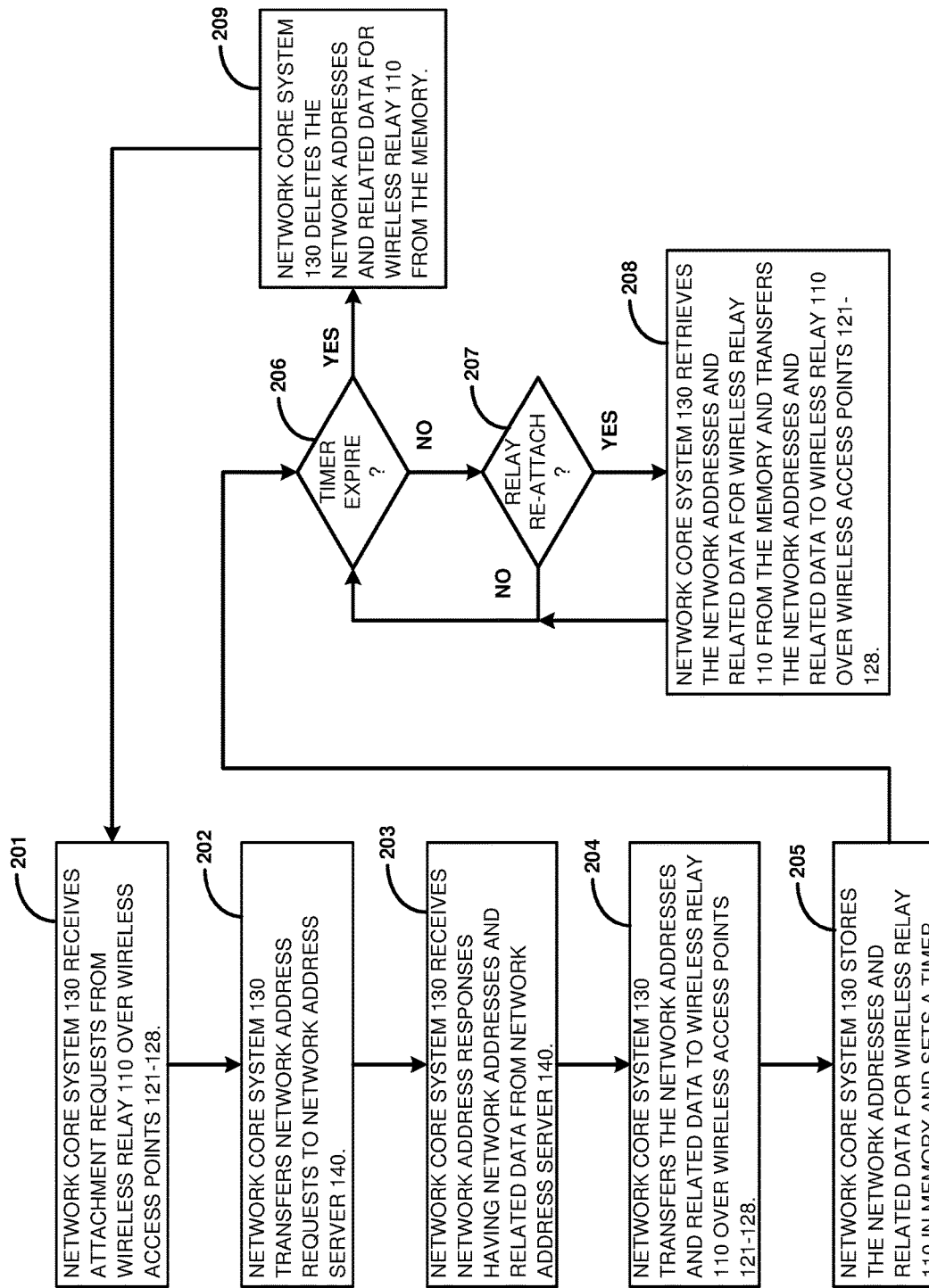

FIG. 2 illustrates operations for network core system 130 in wireless data communication network 100. Network core system 130 receives attachment requests from wireless relay 110 over wireless access point 121-128 (201). Network core system 130 transfers network address requests to network address server 140 (202). Network address server 140 processes the network address requests to select network addresses and related data for wireless relay 110.

Network core system 130 receives network address responses back from network address server 140 (203). The network address responses have the network addresses and related data for the wireless relay 110. Network core system 130 transfers the network addresses and related data to wireless relay 110 over wireless access points 121-128 (204). Network core system 130 stores the network addresses and related data for wireless relay 110 in a memory and sets an address storage timer (205). Network core system 130 then exchanges user data for wireless relay 110 between wireless access points 121-128 and external systems. The address storage timer is typically extended during use the of the network addresses.

If the address storage timer expires (206), then network core system 130 deletes the network addresses and related data from the memory (209) and operations restart (201). If wireless relay 110 re-attaches (207) before the timer expires (206), then network core system 130 retrieves the network addresses and related data for wireless relay 110 from the memory (208). Network address server 140 is not re-used to get the network addresses and related data for wireless relay 110.

Network core system 130 transfers the network addresses and related data to wireless relay over wireless access points 121-128 (208). Network core system 130 exchanges user data for wireless relay 110 between wireless access points 121-128 and external systems. Advantageously, network core system 130 reduces the usage of network address server 140 to save resources and time during wireless relay re-attachments.

Figure 3:
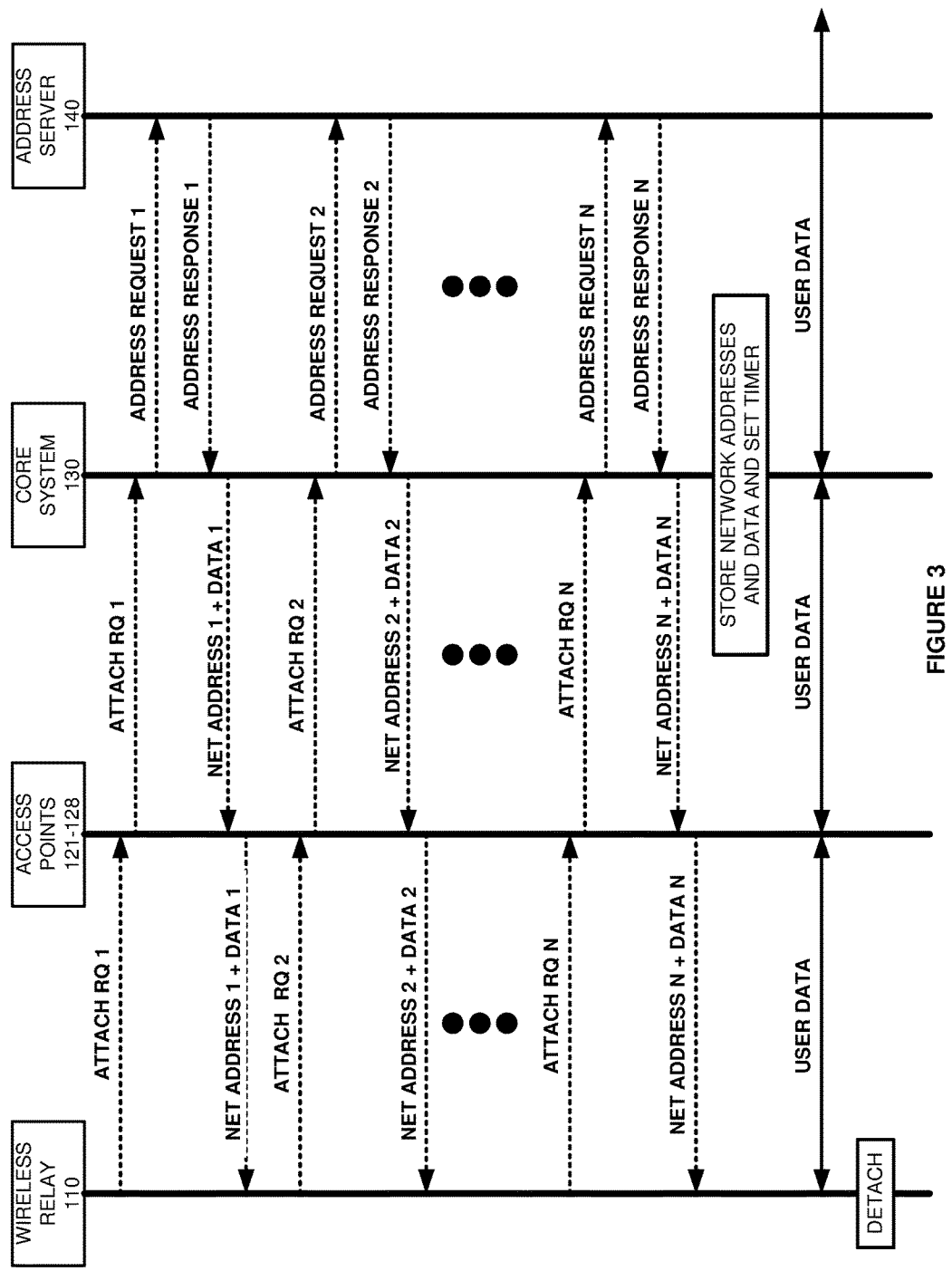
Figure 4:
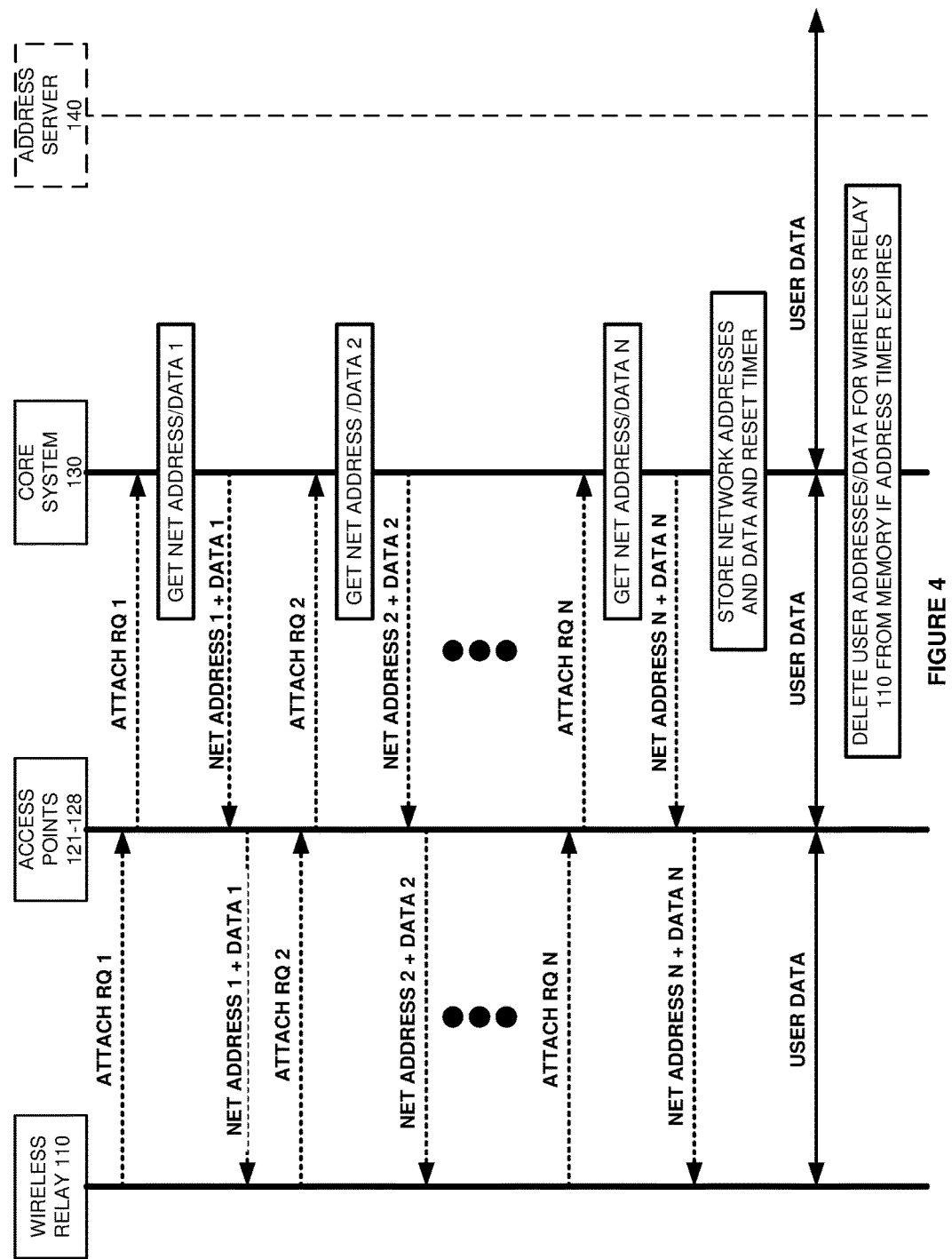

FIGS. 3-4 illustrate operations for wireless data communication network 100. Referring to FIG. 3, wireless relay 110 scans for and attaches to first one of wireless access points 121-128 when relay 110 is powered up. For example, wireless relay 110 may perform an LTE Radio Resource Control (RRC) attachment. The first wireless access point receives the first attachment request (RQ) and transfers a corresponding attachment request to network core system 130. For example, the first wireless access point may receive an LTE RRC attachment request and transfer a corresponding S1-MME Initial UE request to a Mobility Management Entity (MME) in network core system 130.

Network core system 130 receives the first attachment request and responsively transfers the first network address request to network address server 140. This address request could entail a DORA session. Network address server 140 processes the first network address request to select a first network address and related data for wireless relay 110. The first network address may be an Internet Protocol (IP) address, IP port, and IP version. Exemplary related data includes DHCP Options, VLAN data, DNS information, EMS data, and the like.

Network core system 130 receives a first network address response back from network address server 140. The first network address response has the first network address and related data for wireless relay 110. Network core system 130 stores a first wireless access point identifier, first network address, and related data for wireless relay 110 in a memory and sets an address timer. Network core system 130 transfers the network address and related data to the first wireless access point. The first wireless access point wirelessly transfers the first network address and related data to wireless relay 110. For example, an MME may send an S1-MME Initial Session Context request to the first wireless access node, and the first wireless access node may transmit an RRC Connection Reconfiguration message to wireless relay 110.

Wireless relay 110 then scans for and attaches to second wireless access point. The second wireless access point receives the second attachment request and transfers a second attachment request to network core system 130. Network core system 130 receives the second attachment request and responsively transfers the second network address request to network address server 140. This request could entail a second DORA session.

Network address server 140 processes the second network address request to select a second network address and related data for wireless relay 110. Network core system 130 receives a second network address response back from network address server 140. The second network address response has the second network address and related data for wireless relay 110. Network core system 130 stores a second access point identifier, second network address, and related data for wireless relay 110 in the memory. Network core system 130 transfers the second network address and related data to the second wireless access point. The second wireless access point wirelessly transfers the second network address and related data to wireless relay 110.

As indicated by the ellipses on the figure, wireless relay 110 then attaches to additional wireless access points and receives additional network addresses and related data like that above. Eventually, wireless relay 110 scans for and attaches to the Nth wireless access point. The Nth wireless access point receives the Nth attachment request and transfers an Nth attachment request to network core system 130. Network core system 130 receives the Nth attachment request and responsively transfers the Nth network address request to network address server 140. This address request could entail the Nth DORA session.

Network address server 140 processes the Nth network address request to select an Nth network address and related data for wireless relay 110. Network core system 130 receives an Nth network address response back from network address server 140. The Nth network address response has the Nth network address and related data for wireless relay 110. Network core system 130 stores an Nth wireless access point identifier, Nth network address, and related data for wireless relay 110 in the memory. Network core system 130 transfers the Nth network address and related data to the Nth wireless access point. The Nth wireless access point wirelessly transfers the Nth network address and related data to wireless relay 110.

Wireless relay 110 then wirelessly exchanges user data with the UEs. Wireless relay 110 exchanges the user data and the network addresses with at least some of wireless access points 121-128. These wireless access points 121-128 and network core system 130 exchange the user data and the network addresses. Network core system 130 exchanges the user data with external systems based on the network addresses.

Wireless relay 110 eventually detaches from wireless access points 121-128, but network core system 130 does not clear the network addressing and related data for wireless relay 110 until the address timer expires. For example, wireless relay 110 may lose power for 30 seconds, but the address timer may not expire for a minute or two after wireless relay 110 terminates user data exchanges due to the power loss.

Referring to FIG. 4, wireless relay 110 re-attaches to wireless access points 121-128. For example, wireless relay 110 may power back up after a significant brown-out. Wireless relay 110 then scans for and attaches to one of the wireless access points—referred to below as the "first" wireless access point—since it may not be the same as the first wireless access point discussed above in the first attachment sequence. The "first" wireless access point receives the first attachment request and transfers a corresponding first attachment request to network core system 130.

Network core system 130 receives the first attachment request, and since the address timer has not expired, core system 130 retrieves the "first" network address and related data from the memory for wireless relay 110 and the "first" wireless access point. Network address server 140 is not used. Network core system 130 transfers the "first" network address and related data to the "first" wireless access point and sets the address timer. The "first" wireless access point wirelessly transfers the "first" network address and related data to wireless relay 110.

Wireless relay 110 then scans for and attaches to a "second" wireless access point. The "second" wireless access point receives the second attachment request and transfers a second attachment request to network core system 130. Network core system 130 receives the second attachment request and retrieves transfers the "second" network address and related data from the memory since the address timer is still good. Network address server 140 is not used. Network core system 130 transfers the "second" network address and related data to the "second" wireless access point. The "second" wireless access point wirelessly transfers the "second" network address and related data to wireless relay 110.

As indicated by the ellipses on the figure, wireless relay 110 then attaches to additional wireless access points and receives additional network addresses and related data. Eventually, wireless relay 110 scans for and attaches to the "Nth" wireless access point. The Nth wireless access point receives the Nth attachment request and transfers an Nth attachment request to network core system 130. Network core system 130 receives the Nth attachment request and retrieves the "Nth" network address and data for wireless relay 110 from the memory as the address timer is still good. Network address server 140 is not used. Network core system 130 transfers the Nth network address and related data to the Nth wireless access point. The Nth wireless access point wirelessly transfers the Nth network address and related data to wireless relay 110.

Wireless relay 110 wirelessly exchanges user data with the UEs. Wireless relay 110 wirelessly exchanges the user data and the network addresses with at least some of wireless access points 121-128. Wireless access points 121-128 and network core system 130 exchange the user data and the network addresses. Network core system 130 exchanges the user data with external systems based on the network addresses. Network core system 130 eventually deletes the network addressing and related data for wireless relay 110 when the address timer expires.

Advantageously, network core system 130 reduces data access to network address server 140. Moreover, network core system 130 can better handle mass attachment scenarios where multiple wireless relays attempt to re-attach at the same time. The reduction in address server access conserves valuable network resources during re-attachments. The reduction in address server access also saves valuable time during re-attachments.

Figure 5:
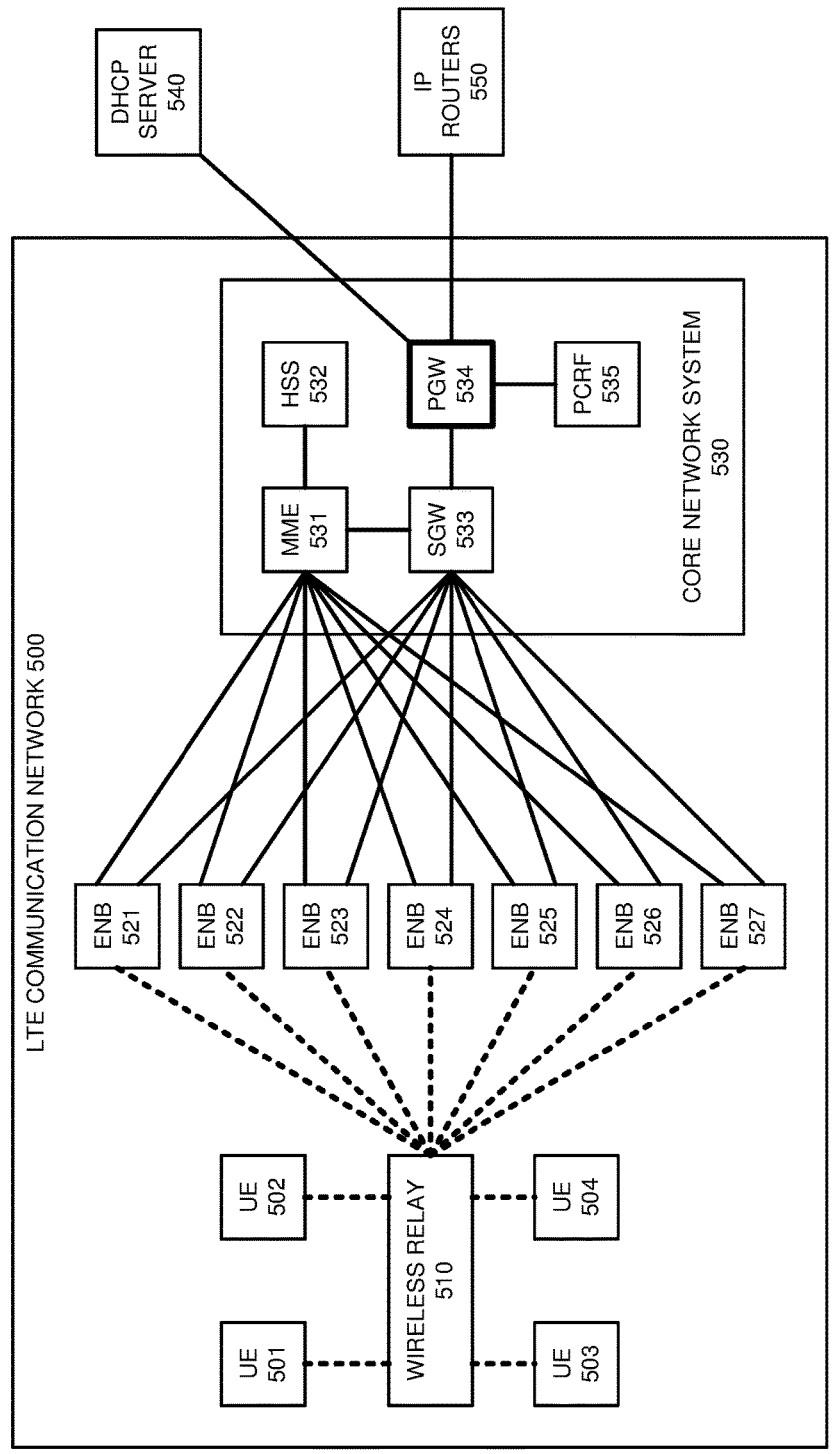
FIG. 5 illustrates a Long Term Evolution (LTE) communication network to distribute Internet Protocol (IP) addresses and networking data to wireless relays.

FIG. 5 illustrates Long Term Evolution (LTE) communication network 500 to distribute Internet Protocol (IP) addresses and networking data to wireless relay 510. LTE communication network is an example of wireless data communication network 100, although network 100 may use alternative configurations and operations. LTE communication network comprises UEs 501-504, wireless relay 510, eNodeBs (ENB) 521-527, and core network system 530. Core network system 530 comprises Mobility Management Entity (MME) 531, Home Subscriber System (HSS) 532, Serving Gateway (S-GW) 533, Packet Data Network Gateway (P-GW) 534, and Policy Charging Rules Function (PCRF) 535.

Before UEs 501-504 attach, wireless relay 510 scans and attaches to eNodeB 521 using the LTE Radio Resource Control (RRC) attachment process. eNodeB 521 transfers a corresponding S1-MME Initial UE request for wireless relay 510 to MME 531 in network core system 530. MME 531 receives the S1-MME Initial UE request and exchanges Diameter messages with HSS 532 to authenticate and authorize wireless relay 510. MME 531 receives an Access Point Name (APN) for wireless relay 510 from HSS 532. MME 531 then transfers an S11 Create Session request with the APN to S-GW 533. S-GW 533 transfers an S5 Create Bearer request with the APN to P-GW 534. P-GW 534 exchanges Diameter messages with PCRF 535 to translate the APN into a Quality-of-Service Class Indicator (QCI) for wireless relay 510. P-GW 534 receives the QCI for wireless relay 510 from PCRF 535.

P-GW 534 then exchanges IP messaging with DHCP server 540 in a DORA session to obtain IP addressing (address, port, version) and related networking data (Options, VLAN, DNS, EMS) to P-GW 534. P-GW 534 stores a Physical Cell Identifier (PCI) for eNodeB 521, the IP addressing, and the related networking data for wireless relay 510 in a memory. P-GW 534 sets an address timer for wireless relay 510.

P-GW 534 transfers an S5 Create Bearer response for wireless relay 510 to S-GW 533. The S5 Create Bearer response indicates the APN, QCI, IP addressing, and related networking data. S-GW 533 transfers an S11 Create Session response for wireless relay 510 to MME 531. The S11 Create Session response indicates the APN, QCI, IP addressing, and related networking data.

MME 531 transfers an S1-MME Initial Session Context request for wireless relay 510 to eNodeB 521. The S1-MME Initial Session Context request indicates the APN, QCI, IP addressing, and related networking data for wireless relay 510. eNodeB 521 transfers an RRC Connection Configuration request to wireless relay 510. The RRC Connection Reconfiguration request indicates the APN, QCI, IP addressing, and related networking data for wireless relay 510.

Wireless relay 510 also attaches to eNodeBs 522-527, and the above process is repeated to obtain additional APNs, QCIs, IP addresses, and related networking data for wireless relay 510. P-GW 534 performs additional DORA sessions and stores additional eNodeB PCIs, IP addressing, and related networking data.

UEs 501-504 then perform LTE RRC attachment to wireless relay 510. UEs 501-504 and wireless relay 510 wirelessly exchange user data. Wireless relay 510 and eNodeBs 521-527 wirelessly exchange the user data and the IP addresses. eNodeBs 521-527 and S-GW 533 exchange the user data and the IP addresses. S-GW 533 and P-GW 534 exchange the user data and the IP addresses. P-GW 534 translates the IP addresses and exchanges the user data and the translated IP addresses with IP routers 550. IP routers 550 perform subsequent IP exchanges.

Wireless relay 510 eventually detaches from eNodeBs 521-527, but P-GW 534 does not clear the IP addressing and related data for wireless relay 510 until the address timer expires. Typically, the address timer will not expire for a minute or so after wireless relay 510 stops exchanging user data through P-GW 534.

Wireless relay 510 re-attaches to eNodeBs 521-527. For example, wireless relay 510 may re-attach after a user resets relay 510. Wireless relay 510 scans and attaches to eNodeB 521. eNodeB 521 transfers an S1-MME Initial UE request for wireless relay 510 to MME 531. MME 531 exchanges Diameter messages with HSS 532 to authenticate and authorize wireless relay 510. MME 531 receives the APN for wireless relay 510 from HSS 532. MME 531 transfers an S11 Create Session request with the APN to S-GW 533. S-GW 533 transfers an S5 Create Bearer request with the APN to P-GW 534. P-GW 534 exchanges Diameter messages with PCRF 535 which translates the APN into the QCI for wireless relay 510. P-GW 534 receives the QCI for wireless relay 510 from PCRF 535.

P-GW 534 retrieves the unexpired IP addressing and related networking data for wireless relay 510 and eNodeB 521 from its memory. The DORA session with DHCP server 540 is avoided. The networking data may include DHCP Options, VLAN data, DNS information, EMS data, and the like. P-GW 534 sets the address timer. P-GW 534 transfers an S5 Create Session response for wireless relay 510 to S-GW 533. The S5 Create Bearer response indicates the APN, QCI, IP addressing, and related networking data. S-GW 533 transfers an S11 Create Session response for wireless relay 510 to MME 531. The S11 Create Session response indicates the APN, QCI, IP addressing, and related networking data.

MME 531 transfers an S1-MME Initial Session Context request for wireless relay 510 to eNodeB 521. The S1-MME Initial Session Context request indicates the APN, QCI, IP addressing, and related networking data for wireless relay 510. eNodeB 521 transfers an RRC Connection Reconfiguration request to wireless relay 510. The RRC Connection Reconfiguration request indicates the APN, QCI, IP addressing, and related networking data for wireless relay 510.

Wireless relay 510 attaches to eNodeBs 522-527 and the above process is repeated to obtain additional APNs, QCIs, IP addresses, and related networking data for wireless relay 510. P-GW 534 retrieves the unexpired IP addressing and related networking data from its memory and avoids additional DORA sessions.

UEs 501-504 then reattach and wirelessly exchange user data with wireless relay 510. Wireless relay 510 and eNodeBs 521-527 wirelessly exchange the user data and the IP addresses. eNodeBs 521-527 and S-GW 533 exchange the user data and the IP addresses. S-GW 533 and P-GW 534 exchange the user data and the IP addresses. P-GW 534 translates the IP addresses and exchanges the user data and the translated IP addresses with IP routers 550. IP routers 550 exchange the user data with other systems based on the translated IP addresses. P-GW 534 eventually deletes the IP addressing and related networking data for wireless relay 510 when the address timer expires.

Advantageously, P-GW 534 significantly reduces data access to DHCP server 540. Moreover, P-GW 534 manages mass attachment scenarios where multiple wireless relays attempt to re-attach at the same time. The reduction in access to DHCP server 540 conserves network resources and time during later re-attachments.

Figure 6:
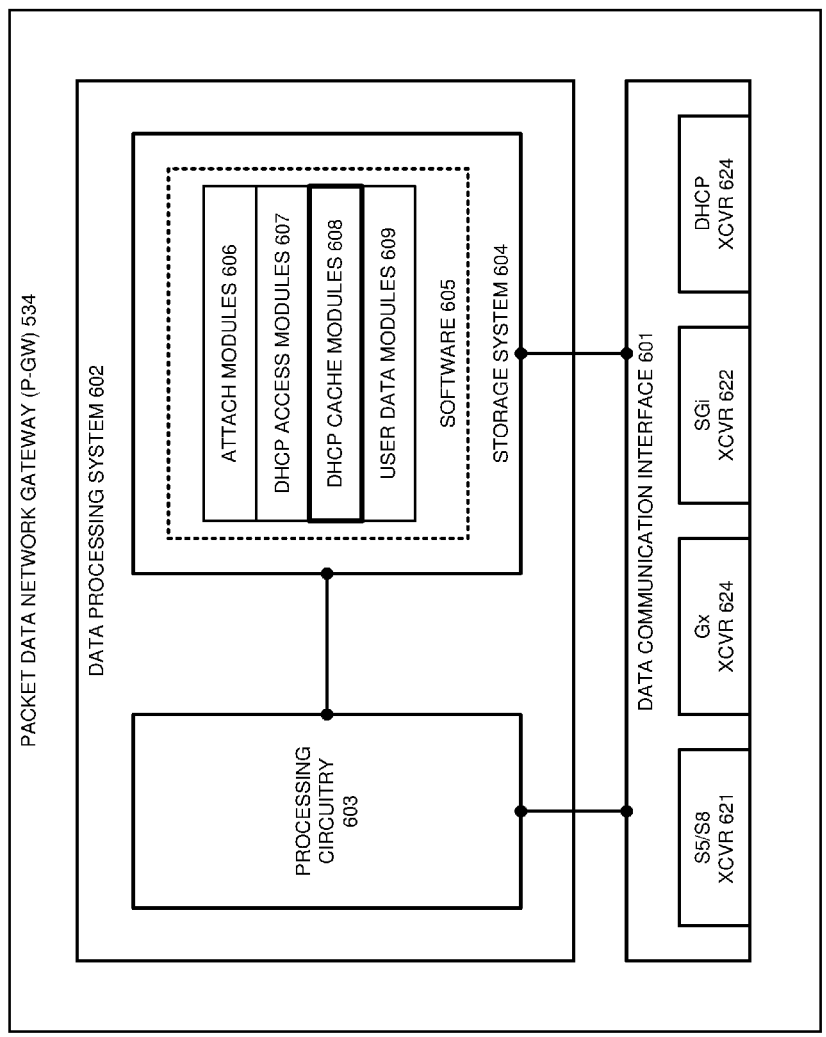
FIG. 6 illustrates a Packet Data Network Gateway (P-GW) to distribute Internet Protocol (IP) addresses and networking data to wireless relays.

FIG. 6 illustrates Packet Data Network Gateway (P-GW) 534 to distribute Internet Protocol (IP) addresses and networking data to wireless relays. P-GW 534 is an example of network core system 130, although core system 130 may use alternative configurations and operations. P-GW 534 comprises data communication interface 601 and data processing system 602. Data communication interface 601 comprises S5/S8 transceiver 621, Gx transceiver 622, SGi transceiver 623, and Dynamic Host Configuration Protocol (DHCP) transceiver 624. Data processing system 602 comprises processing circuitry 603 and storage system 604. Storage system 604 stores software 605. Software 605 includes respective software modules 606-609.

Transceivers 621-624 comprise communication components, such as ports, bus interfaces, digital signal processors, memory, software, and the like. Processing circuitry 603 comprises circuit boards, bus interfaces, integrated microprocessing circuitry, and associated electronics. Storage system 604 comprises non-transitory, machine-readable, data storage media, such as flash drives, disc drives, memory circuitry, data servers, and the like. Software 605 comprises machine-readable instructions that control the operation of processing circuitry 603 when executed. P-GW 534 may be centralized or distributed. All or portions of software 606-609 may be externally stored on one or more storage media, such as circuitry, discs, and the like. Some conventional aspects of P-GW 534 are omitted for clarity, such as power supplies, enclosures, and the like.

When executed by processing circuitry 603, software modules 606-609 direct circuitry 603 to perform the following operations. Attach modules 606 process S5/S8 signaling from S-GWs and handle Diameter messaging with PCRFs. Attach modules 606 get IP addressing and related networking data from DHCP cache modules 607. Attach modules 606 also transfer S5/S8 signaling with the IP addressing and related networking data to the S-GWs.

DHCP access modules 607 perform DORA processes to get the IP addressing and related networking data from DHCP servers. DHCP cache modules 608 get the IP addressing and related networking data from DHCP access modules 607. DHCP cache modules 608 store Physical Cell Identifiers (PCIs), IP addressing, and related networking data in storage system 604. DHCP cache modules 608 maintain IP address Time-To-Live (TTL) timers for wireless relays. DHCP cache modules 608 reset the TTLs based on IP address usage. DHCP cache modules 608 delete the pertinent PCIs, IP addressing, and related networking data from storage system 604 if the associated IP address TTL expires.

User data modules 609 filter and count user data and translate network IP addressing into public IP addressing. User data modules 609 notify DHCP cache modules 608 of the user data exchanges for wireless relays. User data modules 609 exchange the user data and the public IP addressing with IP servers over SGi interfaces.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless data communication network to distribute network addresses and Dynamic Host Configuration Protocol (DHCP) Option data to a wireless relay, the method comprising:
    the wireless relay wirelessly transferring multiple attachment requests to a wireless access point;
    the wireless access point wirelessly receiving the multiple attachment requests from the wireless relay and responsively transferring the multiple attachment requests to a wireless network core;
    the wireless network core receiving the multiple attachment requests and transferring multiple network address requests to a DHCP server;
    in response to transferring the multiple address requests to the DHCP server, the wireless network core receiving multiple network address responses from the DHCP server having network addresses and the DHCP Option data for the wireless relay, and responsively storing the network addresses and the DHCP Option data for the wireless relay in a memory and transferring the network addresses and the DHCP Option data to the wireless access point;
    the wireless access point wirelessly exchanging user data with the wireless relay;
    the wireless network core wirelessly receiving subsequent attachment requests from the wireless relay over the wireless access point and responsively retrieving the network addresses and the DHCP Option data for the wireless relay from the memory without re-using the DHCP server and wirelessly transferring the network addresses and the DHCP Option data to the wireless relay over the wireless access point; and
    the wireless access point wirelessly exchanging subsequent user data with the wireless relay.

2. The method of claim 1 wherein the multiple network address responses from the network address server also have Dynamic Host Configuration Protocol (DHCP) Option 43 data for the wireless relay, and further comprising the wireless network core storing the DHCP Option 43 data for the wireless relay in the memory, wirelessly transferring the DHCP Option 43 data to the wireless relay over the wireless access point, and responsive to subsequent attachment requests from the wireless relay, retrieving the DHCP Option 43 data for the wireless relay from the memory without re-using the network address server and transferring the DHCP Option 43 data to the wireless relay over the wireless access point.

3. The method of claim 1 wherein the multiple network address responses from the network address server also have Dynamic Host Configuration Protocol (DHCP) Option 60 data for the wireless relay, and further comprising the wireless network core storing the DHCP Option 60 data for the wireless relay in the memory, wirelessly transferring the DHCP Option 60 data to the wireless relay over the wireless access point, and responsive to subsequent attachment requests from the wireless relay, retrieving the DHCP Option 60 data for the wireless relay from the memory without re-using the network address server and transferring the DHCP Option 60 data to the wireless relay over the wireless access point.

4. The method of claim 1 wherein the multiple network address responses from the DHCP server also have Domain Name Service (DNS) network addresses for the wireless relay, and further comprising:
    storing the DNS network addresses for the wireless relay in the memory;
    transferring the DNS network addresses to the wireless relay; and
    responsive to subsequent attachment requests from the wireless relay, retrieving the DNS network addresses for the wireless relay from the memory without re-using the DHCP server and transferring the DNS network addresses to the wireless relay without re-using the DHCP server.

5. The method of claim 1 wherein the multiple network address responses from the DHCP server also have Virtual Local Area Network Identifiers (VLAN IDs) for the wireless relay, and further comprising:
storing the VLAN IDs for the wireless relay in the memory;
transferring the VLAN IDs to the wireless relay; and
responsive to subsequent attachment requests from the wireless relay, retrieving the VLAN IDs for the wireless relay from the memory without re-using the DHCP server and transferring the VLAN IDs to the wireless relay.

6. The method of claim 1 wherein further comprising:
setting a timer responsive to receiving the multiple network address responses from the DHCP server; and
deleting the network addresses and the DHCP Option data for the wireless relay from the memory if the timer expires.

7. The method of claim 1 wherein the network addresses comprise Internet Protocol (IP) addresses.

8. The method of claim 1 wherein the network addresses comprise Internet Protocol (IP) ports.

9. The method of claim 1 wherein the wireless data communication network comprises a Long Term Evolution (LTE) Packet Data Network Gateway (P-GW).

10. A wireless data communication network to distribute network addresses and Dynamic Host Configuration Protocol (DHCP) Option data to a wireless relay, the wireless data communication network comprising:
the wireless relay configured to wirelessly transfer multiple attachment requests to a wireless access point;
the wireless access point configured to wirelessly receive the multiple attachment requests from the wireless relay and wirelessly transfer the multiple attachment requests to a wireless network core;
the wireless network core configured to wirelessly receive the multiple attachment requests from the wireless access point, transfer multiple network address requests to a DHCP server, receive multiple network address responses from the DHCP server having network addresses and the DHCP Option data for the wireless relay, store the network addresses and the DHCP Option data for the wireless relay in a memory, and transfer the network addresses and the DHCP Option data to the wireless access point;
the wireless access point configured to wirelessly transfer the network addresses and the DHCP Option data to the wireless relay, wirelessly exchange user data with the wireless relay, wirelessly receive subsequent attachment requests from the wireless relay, and wirelessly transfer the subsequent attachment requests to the wireless network core;
the wireless network core configured to receive the subsequent attachment requests, retrieve the network addresses and the DHCP Option data for the wireless relay from the memory without re-using the DHCP server, and transfer the network addresses and the DHCP Option data to the wireless access point; and
the wireless access point configured to wirelessly transfer the network addresses and the DHCP Option data to the wireless relay and to wirelessly exchange subsequent user data with the wireless relay.

11. The wireless data communication network of claim 10 wherein the multiple network address responses from the network address server also have Dynamic Host Configuration Protocol (DHCP) Option 43 data for the wireless relay, and further comprising the wireless network core configured to store the DHCP Option 43 data for the wireless relay in the memory, wirelessly transfer the DHCP Option 43 data to the wireless relay over the wireless access point, and responsive to subsequent attachment requests from the wireless relay, retrieve the DHCP Option 43 data for the wireless relay from the memory without re-using the network address server and transferring the DHCP Option 43 data to the wireless relay over the wireless access point.

12. The wireless data communication network of claim 10 wherein the multiple network address responses from the network address server also have Dynamic Host Configuration Protocol (DHCP) Option 60 data for the wireless relay, and further comprising the wireless network core configured to store the DHCP Option 60 data for the wireless relay in the memory, wirelessly transfer the DHCP Option 60 data to the wireless relay over the wireless access point, and responsive to subsequent attachment requests from the wireless relay, retrieve the DHCP Option 60 data for the wireless relay from the memory without re-using the network address server and transferring the DHCP Option 60 data to the wireless relay over the wireless access point.

13. The wireless data communication network of claim 10 wherein the multiple network address responses from the DHCP server also have Domain Name Service (DNS) network addresses for the wireless relay, and further comprising:
the network core system configured to store the DNS network addresses for the wireless relay in the memory, transfer the DNS network addresses to the wireless access points, retrieve the DNS network addresses for the wireless relay from the memory responsive to the subsequent attachment requests for the wireless relay without re-using the DHCP server, and transfer the DNS network addresses to the wireless access points; and
the wireless access points configured to receive the DNS network addresses from the network core system and wirelessly transfer the DNS network addresses to the wireless relay.

14. The wireless data communication network of claim 10 wherein the multiple network address responses from the DHCP server also have Virtual Local Area Network Identifiers (VLAN IDs) for the wireless relay, and further comprising:
the network core system configured to store the VLAN IDs for the wireless relay in the memory, transfer the VLAN IDs to the wireless access points, retrieve the VLAN IDs for the wireless relay from the memory responsive to the subsequent attachment requests for the wireless relay without re-using the DHCP server, and transfer the VLAN IDs to the wireless access points;
the wireless access points configured to receive the VLAN IDs from the network core system and wirelessly transfer the VLAN IDs to the wireless relay.

15. The wireless data communication network of claim 10 wherein the network core system is configured to set a timer responsive to receiving the multiple network address responses from the DHCP server and delete the network addresses and the DHCP Option data for the wireless relay from the memory if the timer expires.

16. The wireless data communication network of claim 10 wherein the network addresses comprise Internet Protocol (IP) addresses.

17. The wireless data communication network of claim 10 wherein the network addresses comprise Internet Protocol (IP) ports.

18. The wireless data communication network of claim 10 wherein the network core system comprises a Long Term Evolution (LTE) Packet Data Network Gateway (P-GW).

* * * * *